Figure 1:
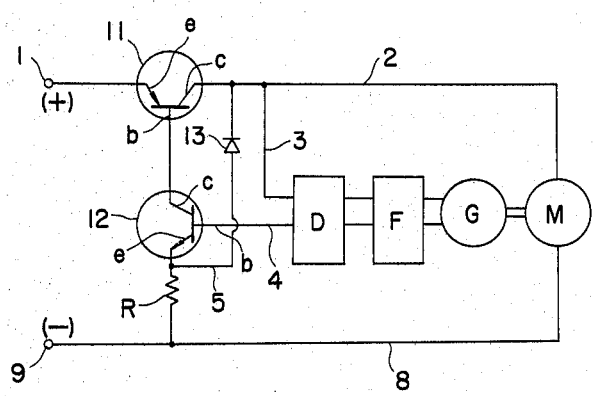

Feb. 1, 1966   MATSUO MISHIMA   3,233,163
PLURAL SPEED TACHOMETER-GENERATOR SPEED CONTROL SYSTEM
Filed March 28, 1963   2 Sheets-Sheet 1

INVENTOR
MATSUO MISHIMA
BY
ATTORNEY

United States Patent Office 3,233,163
Patented Feb. 1, 1966

3,233,163
PLURAL SPEED TACHOMETER-GENERATOR
SPEED CONTROL SYSTEM
Matsuo Mishima, 23–8 6-chome, Denenchofu, Ohta-ku, Tokyo, Japan
Filed Mar. 28, 1963, Ser. No. 268,830
Claims priority, application Japan, Feb. 23, 1963, 38/9,165
5 Claims. (Cl. 318—327)

This invention relates to a system for controlling the constant speed of a direct-current motor and in particular to a feedback type of system for controlling the speed of such a motor, it being especially applicable to a miniature D.C. motor.

In the past, it was common to provide constant speed motor circuits having an electromechanical governor which intermittently interrupted the series circuit of the armature in response to the rate of rotation of the armature shaft. Since this governor consisted of a vibrating element which comprised a combination of a centrifugal weight and a resilient member, there was a tendency to set up transient phenomenon. In addition, problems were encounted in setting up the governor and insuring good contact at the contact points.

On the other hand, in view of the improvements in the performance reliability of the ultraminiature D.C. motor of the type shown in U.S. Patent 2,919,360, the means for governing the speed of the motor became an important factor.

There are known systems in which a D.C. motor is connected to a D.C. or an A.C. generator and a transistor amplifier in a by pass circuit is operated in response to the generated D.C. voltage or rectified voltage of the A.C. generator to prevent a variation in the rotation of the motor due to fluctuations in the applied voltage or to variations in the load. In this system, it was not possible to avoid changes in motor speed due to fluctuations in the temperature of the transistor amplifier.

Another known system comprises connecting an A.C. generator to a D.C. motor, supplying the A.C. frequency generated by this A.C. generator and a standard frequency source to a modulator, taking out only the difference between the two frequencies and operating therewith through a trigger circuit and a multivibrating circuit a series control circuit for the field of motor thereby controlling the constant speed operation of the motor. A serious defect in this system is its requirement for a standard frequency. Moreover, its circuit construction is complex. Hence, it is entirely unsuited in principle as well as from a structural standpoint for controlling the constant speed of an ultraminiature D.C. motor.

The system according to the present invention includes means for controlling the constant speed of a D.C. motor by employing a series transistor amplifier and a filter in a feedback loop circuit connected to the output side of an A.C. frequency generator which is directly connected to the transistor amplifier circuit. The frequency characteristics of the filter are selected in accordance with the output frequency of the frequency generator at the predetermined rated speed of the aforementioned D.C. motor. The aforementioned transistor amplifier is controlled by the voltage passed by said filter to thereby control the constant speed of the D.C. motor. Furthermore, there is provided a system in which by inserting means for changing the frequency as by employing a multifrequency generator or a frequency changer for stepping up or stepping down the frequency and by switching to filters having different cutoff points, it becomes possible to vary the set-up constant speed of a D.C. motor.

Accordingly, the present invention has the following objects:

A primary object is to provide an improved controlling system having stable characteristics and reliability for controlling the speed of a D.C. motor.

For achieving the foregoing objective, an A.C. frequency generator is connected to a D.C. motor, preferably by directly connecting the shafts of both machines, and a transistor amplifier circuit connected in a bypass circuit connected across said motor is controlled by a voltage obtained by rectifying an A.C. voltage obtained from a filter circuit having as its cutoff point the output frequency of the A.C. frequency generator generated at the preselected rated speed of the motor. Hence, the preselected rated speed of the motor can be varied either by changing the output frequency of the A.C. frequency generator, by changing the cutoff point of the filter circuit, or by interposing between the generator and the filter a frequency changer for stepping up or stepping down the frequency. This invention, therefore, has also the following objects.

Another object of this invention is to provide a controlling system in which there is employed a multielement frequency generator and by switching between the elements thereof to cause the flow to a selected filter circuit having a fixed cutoff point at the desired frequency according to the speed of the generator thereby varying in response thereto the rotation of the generator to be cut off and to thus maintain the preselection rated speed of the motor.

A further object of the invention is to provide in a controlling system for maintaining the set-up rated speed of a D.C. motor, which comprises interposing between a frequency generator and a filter circuit a frequency stepping up or step down means thereby step up or stepping down the output frequency of the generator to thus vary the rotation of the generator at cut-off speed.

A still further object of this invention is to provide a controlling system in which filter circuits having different cutoff points are provided whereby by switching between these different circuits the cutoff points are varied thereby effecting in accordance therewith the switching and control of the set-up rated speeds of the motor which is coupled to said A.C. frequency generator.

Figure 2:
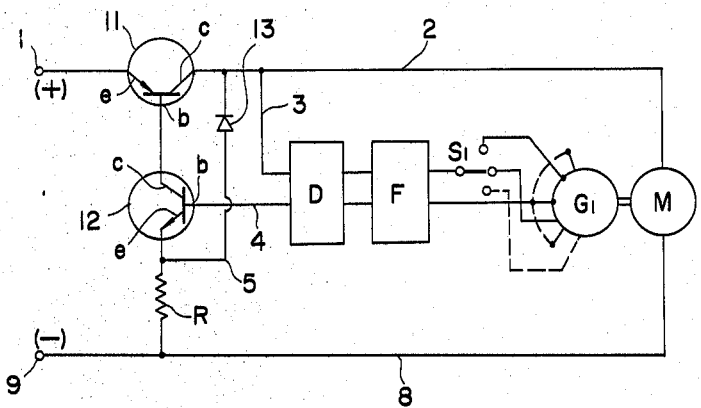
Figure 3:
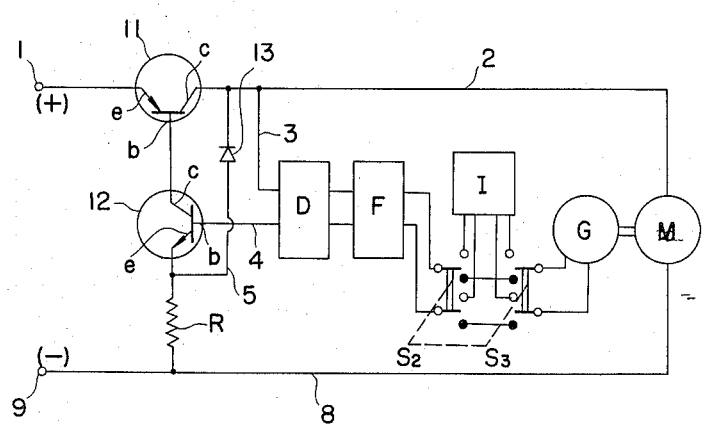
Figure 4:
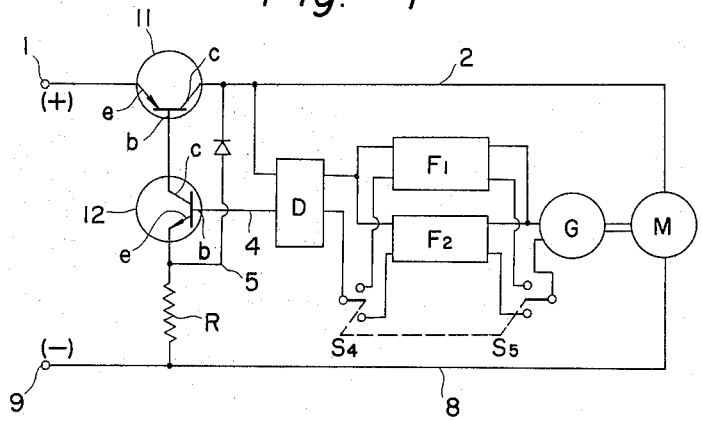

The invention will be more fully understood from the following description taken in connection with the accompanying drawings which illustrate embodiments of the invention, in which:

FIG. 1 is a circuit diagram of a system for controlling the constant speed of a D.C. motor according to this invention. FIGS. 2 to 4 are circuit diagrams in which changing the constant speed of a D.C. motor is effected; FIG. 2 being a circuit in which there is provided a multielement frequency generator adapted to change the output frequency of a frequency generator without changing its speed; FIG. 3 being a circuit in which there is inserted between a frequency generator and a filter circuit, so as to be switchable, a means for either stepping up or stepping down the frequency; and FIG. 4 showing a circuit in which are provided selectable filters having differing cutoff points.

In FIG. 1, a transistor amplifier for motor control purposes 11 is connected in series to that of a power supply source positive terminal 1, an emitter $e$, a collector $c$, a motor M, and a power supply source negative terminal 9. Between a base $b$ of said amplifier 11 and the negative terminal of the power supply source there is provided a by pass circuit, a collector $c$, and an emitter $e$ of an error amplifier 12 connected to the negative terminal 8 of the motor through a resistor R. A circuit from a frequency generator G connected to motor M has its one end 4 connected to the base of the error amplifier 12 through a filter circuit F and a rectification circuit D while its other end 3 is connected to a positive terminal 2 of the motor. On the other hand, the emitter electrode of amplifier 12 is likewise connected on lead 5 to the positive terminal of the motor through a diode 13. It is preferred that the frequency generator employed in this invention be one whose energy losses are low. The filter circuit F is also preferably one whose cutoff of the frequency at the established standard frequency is relatively as sharp. In the present invention a high pass filter is employed in the embodiments illustrated. A typical filter and rectifier circuit which may be used is illustrated in U.S. Patent No. 2,302,834 dated Nov. 24, 1942 as embodying channels containing filter elements 9 to 12 and rectifier diode 6.

The rated speed of the motor M is set at 3000 r.p.m. and the frequency generated by the generator is set at 800 cycles. If the speed of the motor is below the set-up rated speed of 3000 r.p.m., the output frequency from frequency generator connected to the motor will be less than 800 cycles, the output frequency of the generator owing to the set-up rated speed of the motor. Hence, the output frequency will be cut off in the high pass filter circuit and the input to the base of amplifier 12 via the rectification circuit is small, i.e., the control voltage which is fed back to the feed back loop is, and the internal resistance of the amplifier 11 is low while the effective terminal voltage of the motor armature is high. However, when by reducing the load, the speed of the motor exceeds 3000 r.p.m., the rotation of the generator increases, and as a consequence the output frequency exceeds 800 cycles. As a result, since this frequency passes through the filter circuit F and controls the input to the base of the error amplifier 12 of the voltage rectified by the rectification circuit D, i.e., the control voltage fed back to the feed back loop increases suddenly, the internal resistance of the amplifier for 11 is made to increase so as to cause a fall in the effective terminal voltage of the motor. As a consequence, since the rotation of the motor is caused to fall until the output frequency of the frequency generator reaches 800 cycles, the speed of the motor can be maintained constant at the initially set-up speed of 3000 r.p.m. The control of the set-up rated speed is also accomplished by the same principle when variations occur in the power from the source of power supply. The control frequency can be raised as high as 8000 cycles, if necessary, thus making possible to use any frequency as desired.

Although a high pass filter has been employed in the filter circuits of the embodiments illustrated herein, by making reverse use of the biased working line, the transistors can be connected to make possible to use a low pass filter in the filter circuit.

While the foregoing description was that of a motor in which its speed was fixed at a certain rated speed, say 3000 r.p.m., in FIGS. 2, 3 and 4 there are illustrated systems for control wherein the speeds are changed and in these changed set-up speeds are maintained constant.

FIG. 2, illustrates as a system for by switching by means of a switch $S_1$ to the different elements of a multielement frequency generator which generates different frequencies at a same speed of the motor be controlled so that the set-up rated speeds will change in an amount equal to the selected frequency generated by the respective elements of the multielement frequency generator and the specific frequency of the filter circuit F.

The system shown in FIG. 3 comprises providing a plurality of frequency step-up and step-down means inserted between the frequency generator and the filter circuit F for cutting off at a specific frequency. In this case, the output frequency generated at a same speed of the motor can be changed by passing the output frequency from the generator either directly or through a plurality of frequency changing means by means of gang switches $S_2$, $S_3$, thereby changing the set-up rated speed of the motor which is coupled to the frequency generator and generating the specific frequency that is cut off by the filter circuit, and thereby effecting the control of the constant speed of the various set-up rated speeds of the motor.

The embodiment illustrated by means of FIG. 4 is a circuit in which a plurality of filter circuits $F_1$, $F_2$—each having specifically distinct cutoff frequencies—are employed which are adapted to be switched by means of a gang switch $S_4$, $S_5$. Hence the set-up speed of the motor coupled with the generator can be multistagely varied by means of the rotation of the latter in response to the respective specific cutoff frequencies, and the control of the constant motor speeds can be thus effected.

Since the accuracy of the set-up rated speed in this invention will depend primarily on the precision with which the cutoff frequency of the filter circuit is maintained, an exceptionally stable constant speed performance is obtained. Again, the switching operations illustrated in FIGS. 2 to 4 can be accomplished with simplicity, making possible the multistage control of the constant speed of a motor with the high accuracy of performance.

For the filter circuit of this invention, there is also possible either an electromechanical filter in which mechanical resonance is electrically effected or an amplifying feed back type-filter.

As hereinbefore set forth, since according to the present invention the accuracy of the set-up rated speed depends primarily on the precision of the maintenance of the cutoff frequency of the filter, there is practically no drift with the passage of time in the set-up rated speed of the D.C. motors as compared with the prior art systems for controlling the speed wherein the output of an A.C. generator is merely rectified and employed in controlling a transistor amplifier connected in series. Hence, the stability of the performance according to the system of this invention is such as to make possible the provision of a practical constant speed motor of high reliability and of small size.

What is claimed is:

1. An electrical system for regulating a constant speed D.C. motor comprising an A.C. generator coupled to be driven by said motor, a supply circuit connected to feed said D.C. motor, a transistor amplifier connected in series in said supply circuit and adapted to control the current supplied to said motor, and a feed-back circuit connected to the output of said A.C. generator and connected to control said transistor amplifier and a filter connected in said feed-back circuit having characteristics to pass a voltage which varies according to the frequency of said generator, said feed-back circuit being connected to control said amplifier in response to variations in frequency of said generator in a sense to maintain said frequency constant, a frequency changing circuit connected in said feed back circuit in a sense to change the frequency supplied by said generator to said filter and means provided to adjust said frequency changing circuit in accordance with desired changes in speed of said motor.

2. A control system as set forth in claim 1 in which said frequency changing circuit includes means for stepping-up the frequency supplied by said generator.

3. A control system as set forth in claim 1 in which said frequency changing circuit includes means for stepping-down the frequency supplied by said generator.

4. An electrical system for regulating a constant speed D.C. motor comprising an A.C. generator coupled to be driven by said motor, a supply circuit connected to feed said D.C. motor, a transistor amplifier connected in series in said supply circuit and adapted to control the current supplied to said motor, and a feed-back circuit connected to the output of said A.C. generator and connected to control said transistor amplifier and a filter connected in said feed-back circuit having characteristics to pass a voltage which varies according to the frequency of said generator, said feed-back circuit being connected to control said amplifier in response to variations in frequency of said generator in a sense to maintain said frequency constant, said generator being adapted to generate voltages of different frequencies, while operating at the same speed, and means being provided to supply a selected frequency from said generator to said filter for thereby changing the operating speed of said motor.

5. An electrical system for regulating a constant speed D.C. motor comprising an A.C. generator coupled to be driven by said motor, a supply circuit connected to feed said D.C. motor, a transistor amplifier connected in series in said supply circuit and adapted to control the current supplied to said motor, and a feed-back circuit connected to the output of said A.C. generator and connected to control said transistor amplifier and a filter connected in said feed-back circuit having characteristics to pass a voltage which varies according to the frequency of said generator, said feed-back circuit being connected to control said amplifier in response to variations in frequency of said generator in a sense to maintain said frequency constant, said feed-back circuit including a plurality of filters having different frequency characteristics, and means provided to connect selected filters in said circuit for thereby varying the control voltages supplied to said transistor amplifier.

References Cited by the Examiner
UNITED STATES PATENTS

| | | | |
|---|---|---|---|
| 2,809,339 | 10/1957 | Guggi | 318—327 |
| 3,005,940 | 10/1961 | Johnson | 318—305 |

MILTON O. HIRSHFIELD, *Primary Examiner.*

O. L. RADER, *Examiner.*

S. GORDON, *Assistant Examiner.*